(12) United States Patent
Gao et al.

(10) Patent No.: US 12,439,049 B2
(45) Date of Patent: Oct. 7, 2025

(54) CCSO WITH HIGH LEVEL FLAGS

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US); Jing Ye, Palo Alto, CA (US); Shan Liu, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 18/660,074

(22) Filed: May 9, 2024

(65) Prior Publication Data

US 2025/0119546 A1 Apr. 10, 2025

Related U.S. Application Data

(60) Provisional application No. 63/543,272, filed on Oct. 9, 2023.

(51) Int. Cl.
*H04N 19/132* (2014.01)
*H04N 19/172* (2014.01)
(Continued)

(52) U.S. Cl.
CPC ......... *H04N 19/132* (2014.11); *H04N 19/172* (2014.11); *H04N 19/186* (2014.11); *H04N 19/70* (2014.11)

(58) Field of Classification Search
CPC .... H04N 19/117; H04N 19/132; H04N 19/12; H04N 19/172; H04N 19/186;
(Continued)

(56) References Cited

U.S. PATENT DOCUMENTS

2018/0124400 A1 5/2018 He et al.
2018/0160134 A1 6/2018 Zhang et al.
(Continued)

FOREIGN PATENT DOCUMENTS

WO WO 2022040428 A1 2/2022

OTHER PUBLICATIONS

Y. Du et al. "Cross-Component Sample Offset for Image and Video Coding," 2021 International Conference on Visual Communications and Image Processing (VCIP), Munich, Germany, 2021, pp. 1-5. (Year: 2021).*

(Continued)

*Primary Examiner* — Nathnael Aynalem
(74) *Attorney, Agent, or Firm* — Morgan, Lewis & Bockius LLP

(57) ABSTRACT

Various implementations described herein include methods and systems for coding video. In one aspect, a video bitstream includes a high level syntax element for a frame level cross-component sample offset (CCSO) flag indicating whether to apply CCSO filtering on a current image frame. When the frame level CCSO flag indicates that CCSO filtering is applied the current image frame, an electronic device identifies, in the video bitstream, a first syntax element for a first component CCSO flag indicating whether to apply CCSO filtering on a first color component of the current image frame, and determines whether to apply CCSO filtering on a first color sample of the first color component based on the first syntax element. The current image frame including the first color sample of the first color component is reconstructed.

26 Claims, 7 Drawing Sheets

(51) Int. Cl.
*H04N 19/186* (2014.01)
*H04N 19/70* (2014.01)

(58) Field of Classification Search
CPC ...... H04N 19/70; H04N 19/82; H04N 19/182; H04N 19/184; H04N 19/124
USPC .......................................... 375/240–240.29
See application file for complete search history.

(56) References Cited

U.S. PATENT DOCUMENTS

| | | | |
|---|---|---|---|
| 2021/0176501 A1* | 6/2021 | Chen | H04N 19/172 |
| 2021/0306652 A1* | 9/2021 | Chen | H04N 19/1883 |
| 2022/0030271 A1 | 1/2022 | Li et al. | |
| 2022/0182635 A1 | 6/2022 | Li et al. | |
| 2022/0182641 A1* | 6/2022 | Nam | H04N 19/46 |
| 2022/0191551 A1* | 6/2022 | Zhao | H04N 19/182 |
| 2022/0272336 A1 | 8/2022 | Tourapis | |
| 2022/0337847 A1 | 10/2022 | Chen et al. | |
| 2022/0368928 A1 | 11/2022 | Ma et al. | |
| 2023/0143151 A1 | 5/2023 | Krishnan et al. | |
| 2023/0209093 A1 | 6/2023 | Kuo et al. | |
| 2023/0319315 A1 | 10/2023 | Kuo et al. | |
| 2023/0336748 A1 | 10/2023 | Ye et al. | |
| 2024/0259578 A1 | 8/2024 | Kuo et al. | |

OTHER PUBLICATIONS

Han Gao et al., "Wedge Mode Extensions", Alliance for Open Media, Codec Working Group, CWG-C092_v1, Dec. 14, 2022, 4 pgs.

Peter de Rivaz et al., "AV1 Bitstream & Decoding Process Specification", Version 1.0.0 with Errata 1, The Alliance for Open Media, Jan. 2019, 681 pgs.

Xin Zhao et al., "CWG-B099: Improved CCSO with Luma Extension and Band Feature", Jan. 2022, 5 pgs.

Tencent America LLC, ISR/WO, PCT/US2024/030268, Jul. 9, 2024, 17 pgs.

Tencent America LLC, ISR/WO, PCT/US2024/030273, Aug. 26, 2024, 12 pgs.

Tencent America LLC, ISR/WO, PCT/US2024/030397, Aug. 28, 2024, 17 pgs.

Che-Wei Kuo et al., "Cross-Component Sample Adaptive Offset", 2022 Data Compression Conference (DCC), Mar. 2022, 10 pgs.

Xin Zhao et al., "Study on Coding Tools Beyond AV1", 2021 IEEE International Conference on Multimedia and Expo (ICME), Jul. 2021, 6 pgs.

Yixin Du et al., "Cross-Component Sample Offset for Image and Video Coding", 2021 International Conference on Visual Communications and Image Processing (VCIP), Dec. 2021, 5 pgs.

* cited by examiner

CCSO WITH HIGH LEVEL FLAGS

RELATED APPLICATIONS

This application claims priority to U.S. Provisional Patent Application No. 63/543,272, entitled "CCSO with High Level Flags," filed Oct. 9, 2023, which is hereby incorporated by reference in its entirety.

TECHNICAL FIELD

The disclosed embodiments relate generally to video coding, including but not limited to systems and methods for loop filtering (e.g., cross-component offset (CCSO) filtering) of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes methods, systems, and non-transitory computer-readable storage media for applying a loop filter (e.g., a CCSO filter) for video (image) compression. A video codec includes a plurality of function modules for one or more of: intra/inter prediction, transform coding, quantization, entropy coding, and in-loop filtering. In-loop filtering technologies are applied to adjust reconstructed picture samples to further reduce a reconstruction error. In various embodiments of this application, a video bitstream is communicated between a video encoder and a video decoder, and includes a high level syntax element for a frame level cross-component sample offset (CCSO) flag. The frame level CCSO flag indicates whether to apply CCSO filtering on the current image frame. The video bitstream may further include another syntax element for a respective component CCSO flag when the frame level CCSO flag indicates that CCSO filtering is enabled. The component CCSO flag indicates whether to apply CCSO filtering on the respective color component of the current image frame. Cross-component offset filtering may therefore be controlled on both a frame level and a component level for the respective color component of the current image frame.

In some embodiments, a cross-component sample offset (CCSO) filter uses co-located reconstructed samples and its neighboring reconstructed samples from a first color component (e.g., luma samples) to derive a sample offset value to be added on a current sample of a second color component (e.g., a luma or chroma sample). In some embodiments, the CCSO filter may include an edge preserving loop filter that relies on values of reconstructed samples to determine the sample offset value of luma and/or chroma samples. The CCSO flags for luma/chroma sample offsets are signaled individually for each component at the frame level. Additional high-level flags may be further introduced to control CCSO filtering parameters for different color components as well.

In accordance with some embodiments, a method of video decoding is provided. The method includes receiving a video bitstream including a current image frame. The video bitstream includes a high level syntax element for a frame level cross-component sample offset (CCSO) flag indicating whether to apply CCSO filtering on the current image frame. The method further includes, based on the high level syntax element, determining whether to apply CCSO filtering on the current image frame. The method further includes, when CCSO filtering is applied the current image frame, identifying, in the video bitstream, a first syntax element for a first component CCSO flag indicating whether to apply CCSO filtering on a first color component of the current image frame. The method further includes determining whether to apply CCSO filtering on a first color sample of the first color component of the current image frame based on the first syntax element and reconstructing the current image frame including the first color sample of the first color component. In some embodiments, the high level syntax element includes a frame level syntax element.

In accordance with some embodiments, a method of video encoding is provided. The method includes receiving video data comprising a current image frame, encoding the current image frame, transmitting the encoded current image frame via a video bitstream, and signaling, via the video bitstream, a high level syntax element for a frame level cross-component sample offset (CCSO) flag indicating whether to apply CCSO filtering on the current image frame. A first syntax element is signaled in the video bitstream for a first component CCSO flag indicating whether to apply CCSO filtering on a first color component of the current image frame, when the frame level CCSO flag indicates that CCSO filtering is applied on the current image frame.

In accordance with some embodiments, a method of bitstream conversion is provided. The method includes obtaining a source video sequence including a current image frame and performing a conversion between the source video sequence and a video bitstream. The video bitstream includes the current image frame and a high level syntax element for a frame level cross-component sample offset (CCSO) flag indicating whether to apply CCSO filtering on the current image frame. A first syntax element is signaled in the video bitstream for a first component CCSO flag indicating whether to apply CCSO filtering on a first color component of the current image frame, when the frame level CCSO flag indicates that CCSO filtering is applied on the current image frame.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes methods, systems, and non-transitory computer-readable storage media for applying a loop filter for video (image) compression. In-loop filtering technologies are applied to adjust reconstructed picture samples to further reduce a reconstruction error. In various embodiments of this application, a video bitstream is communicated between a video encoder and a video decoder, and includes a high level syntax element for a frame level cross-component sample offset (CCSO) flag. The frame level CCSO flag indicates whether to apply CCSO filtering on the current image frame. The video bitstream may further include another syntax element for a respective component CCSO flag when the frame level CCSO flag indicates that CCSO filtering is enabled. The component CCSO flag indicates whether to apply CCSO filtering on the respective color component of the current image frame. Cross-component offset filtering may therefore be controlled on both a frame level and a component level for the respective color component of the current image frame.

In some embodiments, a cross-component sample offset (CCSO) filter uses co-located reconstructed samples and its neighboring reconstructed samples from a first color component (e.g., luma samples) to derive a sample offset value to be added on a current sample of a second color component (e.g., a luma or chroma sample). In some embodiments, the CCSO filter may include an edge preserving loop filter that relies on values of reconstructed samples to determine the sample offset value of luma and/or chroma samples. The CCSO flags for luma/chroma sample offsets are signaled individually for each component at the frame level. Additional high-level flags may be further introduced to control CCSO filtering parameters for different color components as well.

More specifically, in some embodiments, a video decoder identifies a set of luma samples including a first luma sample and one or more neighboring luma samples of the first luma sample. The luma samples are quantized, e.g., using a scalar quantizer, to generate one or more quantized values. The scalar quantizer may be specified by quantization intervals (e.g., ranges of values assigned to the same integer) and quantization levels (e.g., integer values to which a quantization interval is assigned). A first color sample is classified, e.g., by a classifier, based on the one or more quantized values to determine a first sample offset of the first color sample. The first color sample is adjusted based on the first sample offset of the first color sample, thereby enabling reconstruction of the current image frame.

Figure 1:
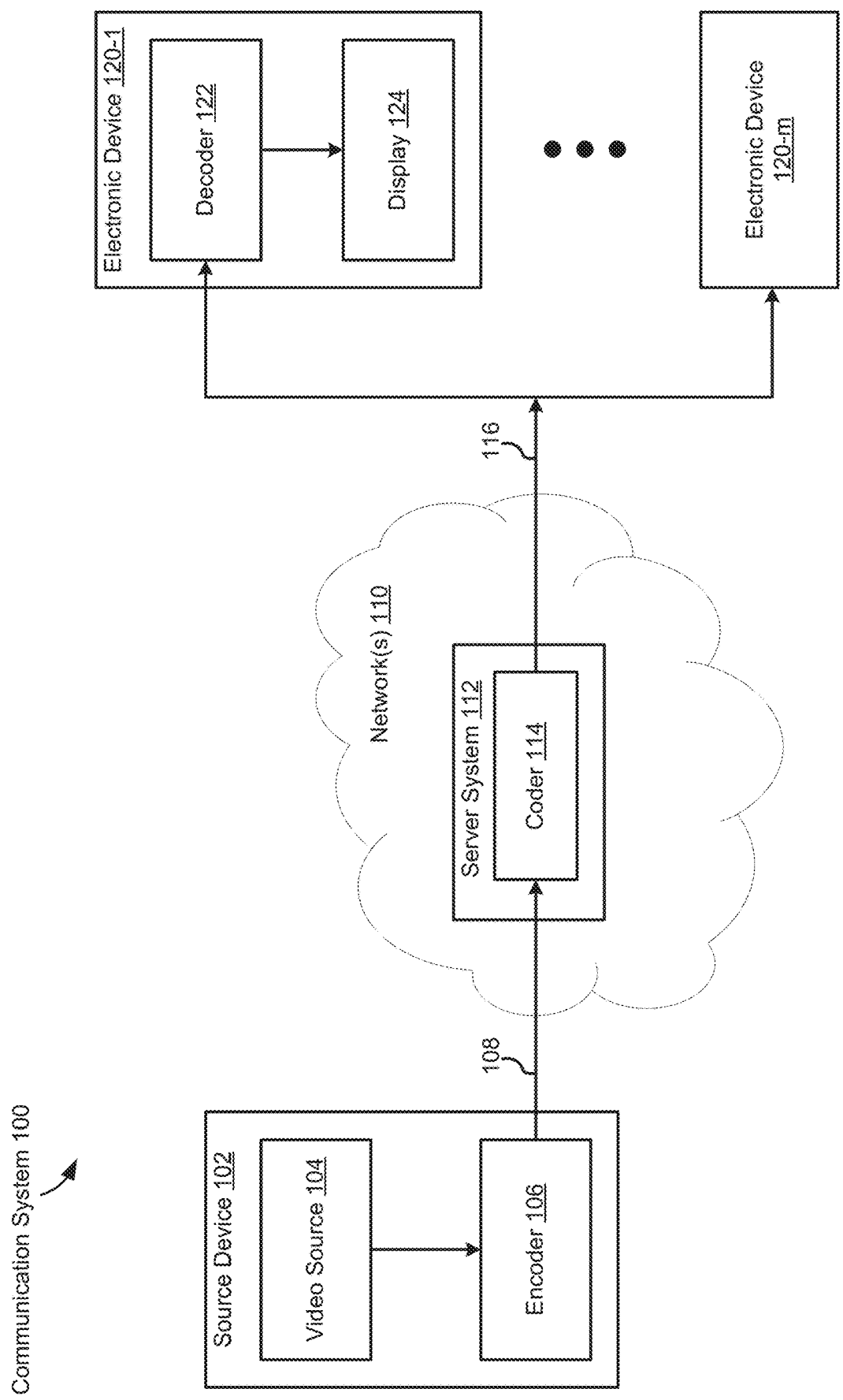
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-$m$) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
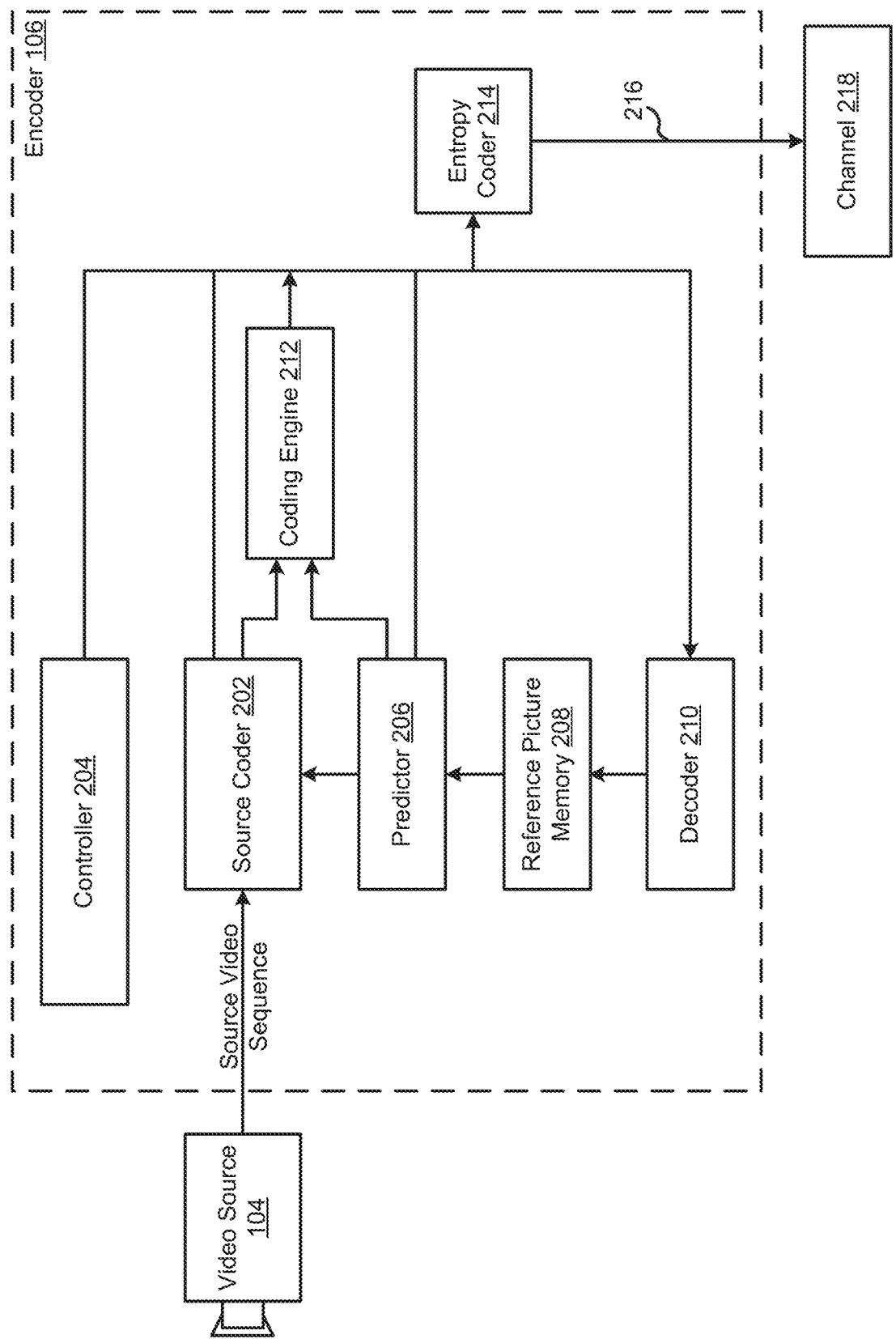
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
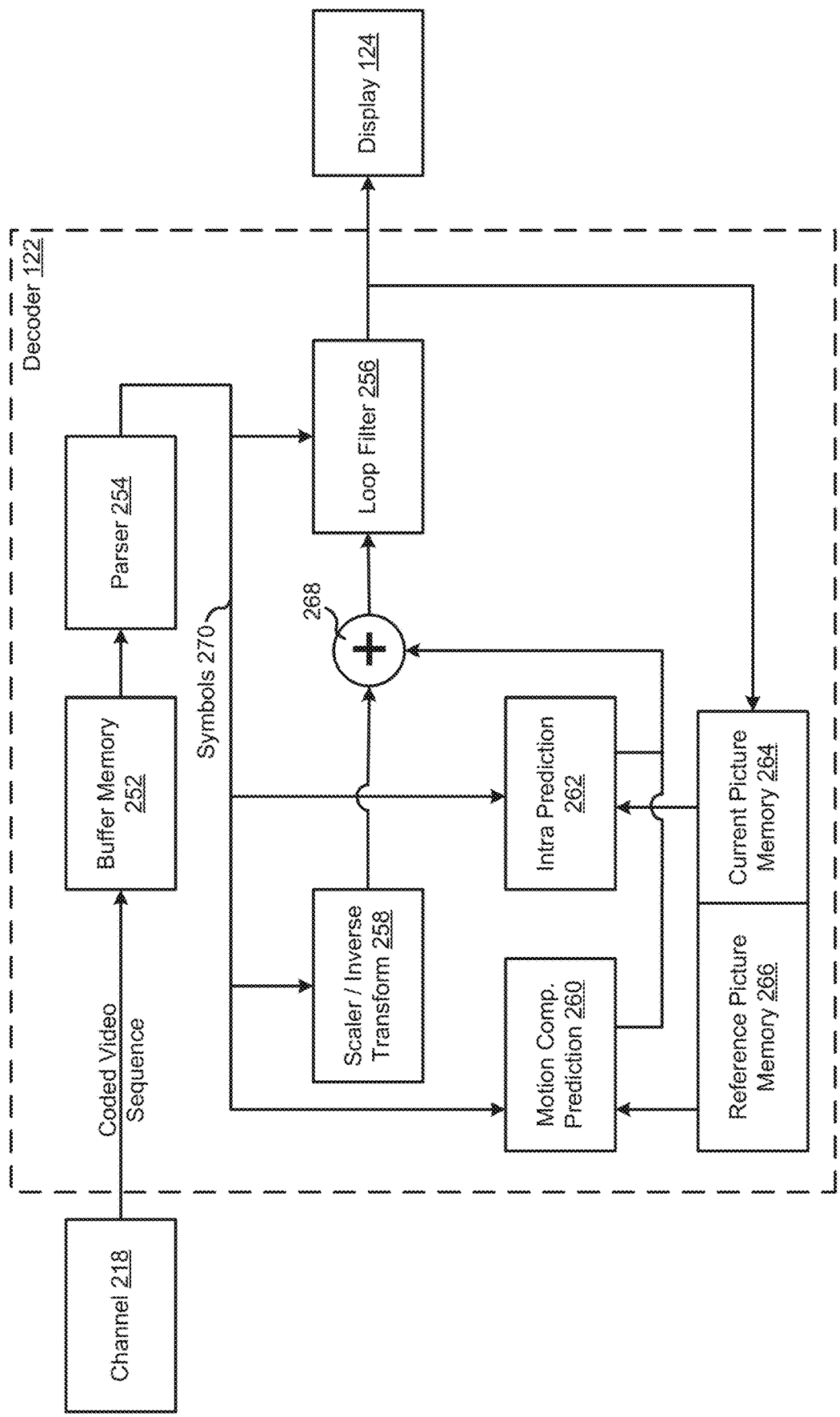
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
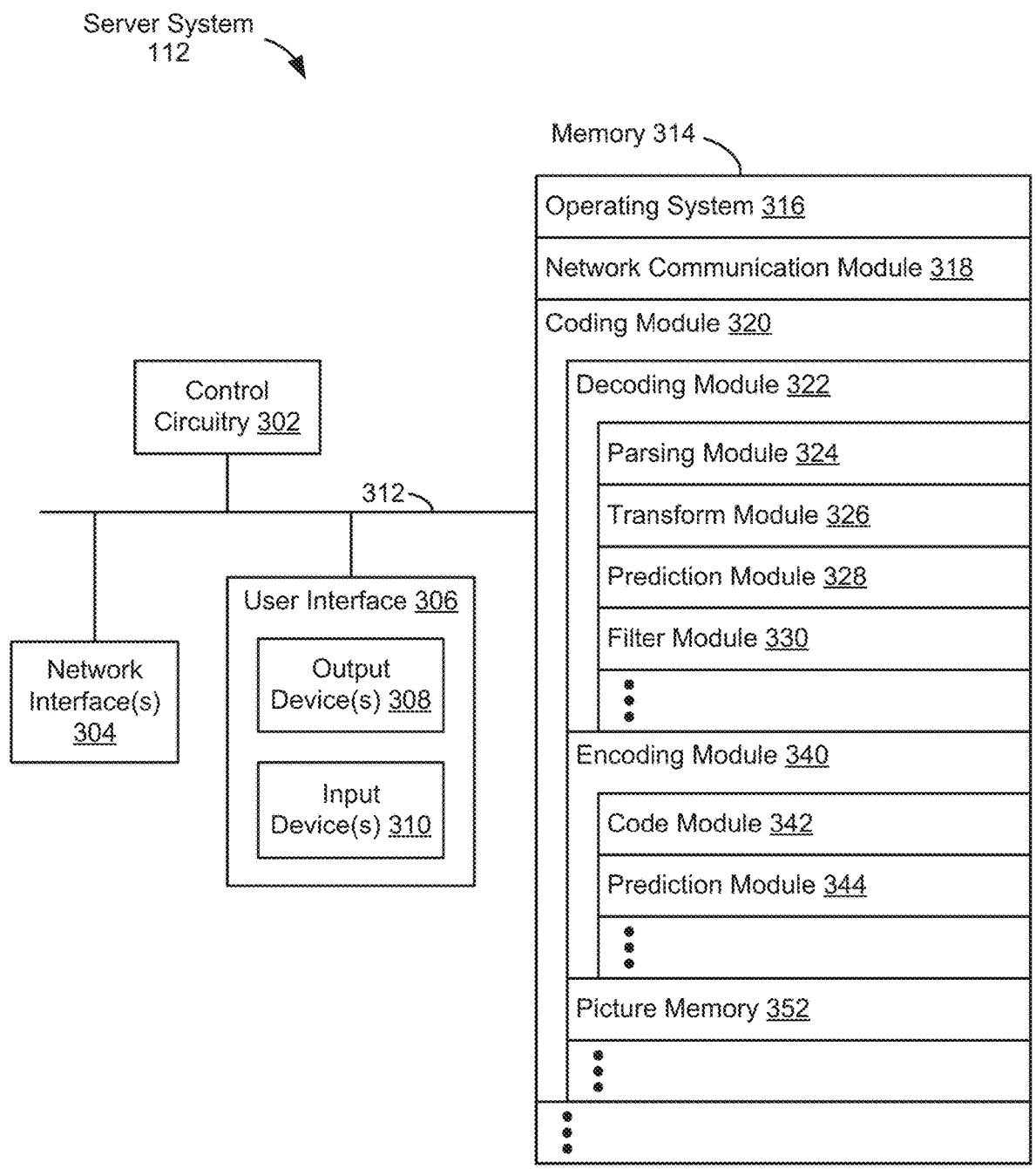
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
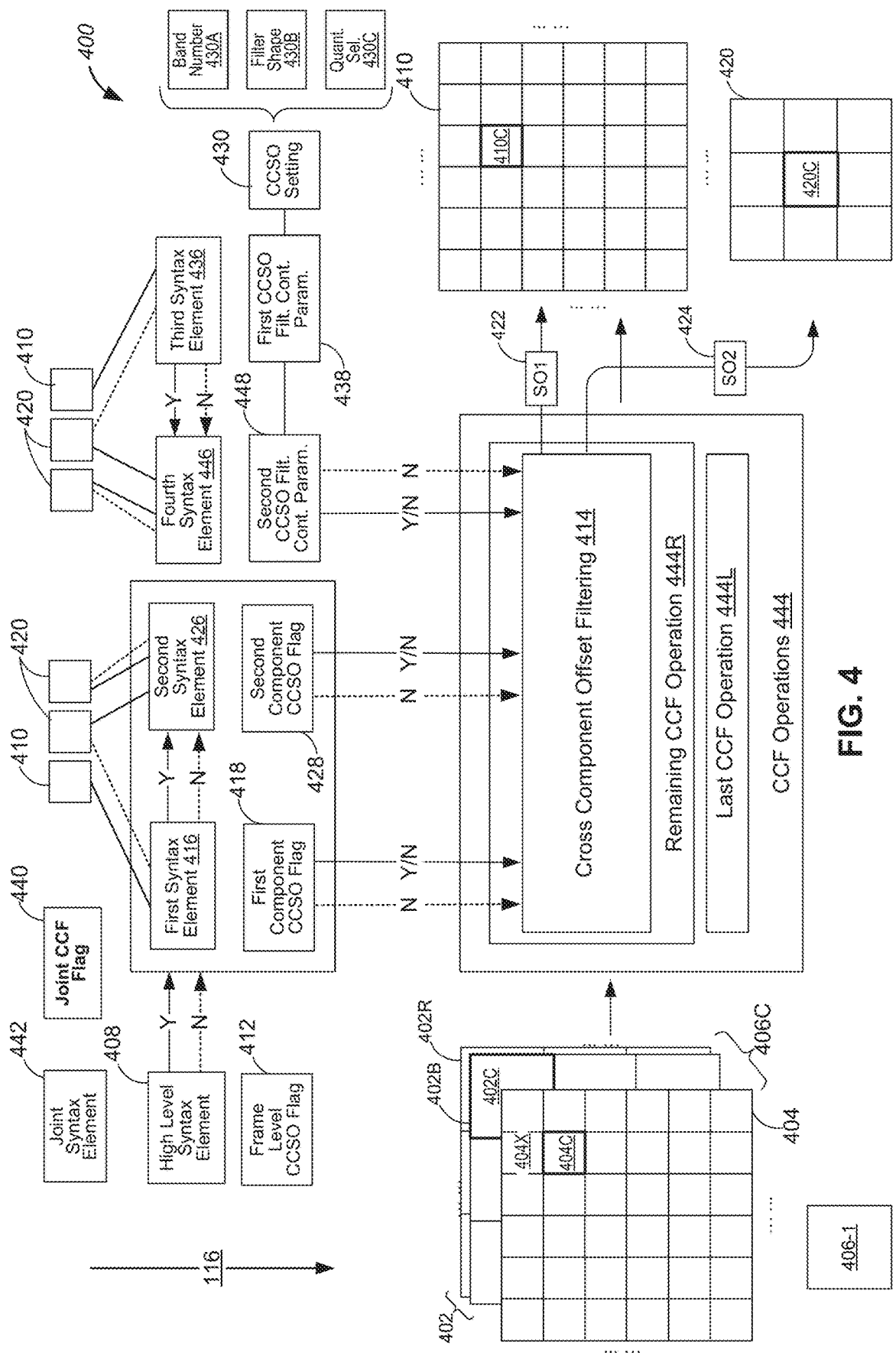
FIG. 4 is a flow diagram of an example process of decoding a video bitstream with CCSO filtering based on flags signaled on different levels, in accordance with some embodiments.

FIG. 4 is a flow diagram of an example process 400 of decoding a video bitstream 116 with CCSO filtering 414 based on flags signaled on different levels, in accordance with some embodiments. A GOP includes a sequence of image frames that further includes a current image frame 406C. The current image frame 406C includes a color image, i.e., a non-monochrome image frame, which has a plurality of color samples (e.g., chroma samples 402 and luma samples 404) co-located with one another. After the plurality of color samples of the current image frame 406C are reconstructed, in-loop filtering is applied to adjust a subset of color samples, thereby improving an image quality of the current image frame 406C. An example of in-loop filtering is CCSO filtering. In some embodiments associated with CCSO filtering, a reconstructed sample and/or its neighboring reconstructed samples of a luma component (e.g., luma samples 404) are combined to derive an offset value 422 for a first color component 410 (e.g., luma samples 404, chroma samples 402), and a reconstructed sample of the first color component 410 is co-located with the reconstructed sample of the luma component and adjusted by the offset value 422. The first color component 410 is optionally identical to or distinct from the luma component.

In some embodiments, a decoder 122 receives a video bitstream 116 including a current image frame 406C. The video bitstream 116 includes a high level syntax element 408 for a frame level cross-component sample offset (CCSO) flag 412 indicating whether to apply CCSO filtering 414 on the current image frame 406C. Based on the high level syntax element 408, the decoder 122 determines whether to apply CCSO filtering 414 on the current image frame 406C. When the frame level CCSO flag 412 indicates that CCSO filtering 414 is applied the current image frame 406C, the video decoder 122 identifies, in the video bitstream 116, a first syntax element 416 for a first component CCSO flag 418 indicating whether to apply CCSO filtering 414 on a first color component 410 of the current image frame 406C, and determines whether to apply CCSO filtering 414 on a first color sample 410C of the first color component 410 based on the first syntax element 416 (e.g., to determine a sample offset 422 for the first color sample 410C). Stated another way, in some embodiments, the video bitstream 116 may transmit the first syntax element 416 as needed, e.g., when the frame level CCSO flag 412 is enabled. In some embodiments, the first color component 410 is one of a luma component 404, a blue-difference chroma component 402B, and a red-difference chroma component 402R. The video decoder 122 reconstructs the current image frame 406C including the first color sample 410C of the first color component 410.

In some embodiments, when the frame level CCSO flag 412 indicates that CCSO filtering is disabled for a first image frame 406-1 (e.g., distinct from the current image frame 406C), the video decoder 122 sets a distinct component CCSO flag to indicate that CCSO filtering 414 is not applied on the first color component 410 of the first image frame 406-1, independently of whether any syntax element for the distinct component CCSO flag of the first image frame 406-1 is signaled in the video bitstream 116. In some embodiments, the distinct component CCSO flag may be signaled in the first syntax element 416 for the first image frame 406-1. Conversely, in some embodiments, the distinct component CCSO flag is not signaled in the video bitstream 116, and is determined locally for the first image frame 406-1 by the video decoder 122.

In some embodiments, after determining the frame level CCSO flag 412 indicates that CCSO filtering 414 is applied on the current image frame 406C, the video decoder 122 determines that the first component CCSO flag 418 indicates that CCSO filtering 414 is not applied on the first color component 410. The video decoder 122 aborts generation of a first sample offset 422 for the first color sample 410C of the first color component 410.

In some embodiments, the video bitstream 112 includes the first syntax element 416 for the first component CCSO flag 418. When the first component CCSO flag 418 indicates that CCSO filtering 414 is disabled for the first color component 410, the video decoder 122 sets a second component CCSO flag 428 to indicate that CCSO filtering 414 is not applied on a second color component 420 of the current image frame 406C, independently of whether a second syntax element 426 is signaled in the video bitstream 112. In other words, CCSO filtering 414 is disabled for the first color component 410 and the second color component 420 jointly, e.g., under the control of the first component CCSO flag 418. The first component CCSO flag 418 may or may not be signaled via the video bitstream 116.

In some embodiments, the video bitstream 116 includes the first syntax element 416 for the first component CCSO flag 418. When the first component CCSO flag 418 indicates that CCSO filtering 414 is applied to the first color component 410, a second syntax element 426 is signaled in the video bitstream 116 to control CCSO filtering 414 of the second color component 420, independently of the first syntax element 416. When the first component CCSO flag 418 indicates that CCSO filtering 414 is applied to the first color component 410, the video decoder 122 identifies, in the video bitstream 116, the second syntax element 426 for a second component CCSO flag 428 indicating whether to apply CCSO filtering 414 on a second color component 420 of the current image frame 406C. The second component CCSO flag 428 is used to determine whether to apply CCSO filtering 414 on a second color sample 420C of the second color component 420 of the current image frame 406C.

Further, in some embodiments, the video decoder 122 determines that the first component CCSO flag 418 indicates that CCSO filtering 414 is applied on the first color component 410. When the second component CCSO flag 428 indicates that CCSO filtering 414 is not applied on the second color component 420, the video decoder 122 aborts generation of a second sample offset 424 for the second color sample 420C of the second color component 420. Conversely, in some embodiments, when the first component CCSO flag 418 indicates that CCSO filtering 414 is applied on the first color component 410 and that the second component CCSO flag 428 indicates that CCSO filtering 414 is applied on the second color component 420, a second sample offset 424 is generated for the second color sample 420C of the second color component 420 based on one or more samples of the first color component 410.

In some embodiments, the first color component 410 includes a luma component 404, and the second color component 420 includes a chroma component 402. Two chroma components 402 include a blue-difference chroma component 402B and a red-difference chroma component 402R. In some embodiments, the first color component 410 includes a first one of the two chroma components 402R and 402B, and the second color component 420 includes a second distinct one of the two chroma components 402R and 402B. In an example, the first color component 410 or the second color component 420 includes a luma component 404, and in accordance with CCSO filtering 414, a sample offset 422 or 424 of a first luma sample 404C is generated using a set of one or more luma samples 404 including at least the first luma sample 404C. In another example, the first color component 410 or the second color component 420 includes a chroma component 402, and in accordance with CCSO filtering 414, a sample offset of a first chroma sample 402C is generated using a set of one or more luma samples 404 including at least the first luma sample 404C.

In some embodiments, the video bitstream 116 includes a third syntax element 436 for a first CCSO filtering control parameter 438 indicating whether to apply a CCSO setting 430 for the first color component 410 of the current image frame 406C. For example, the CCSO setting 430 may include one or more of: a maximum number of bands 430A, a filter shape 430B, and a quantizer selection 430C. When the first CCSO filtering control parameter 438 indicates that the CCSO setting 430 is not applied to the first color component 410, a second CCSO filtering control parameter 448 is set to indicate that the CCSO setting is not applied on a second color component 420 of the current image frame 406C, independently of whether a fourth syntax element 446 associated with the second CCSO filtering control parameter 448 is signaled in the video bitstream 116. That said, in some situations, the first CCSO filtering control parameter 438 and the second CCSO filtering control parameter 448 fail to apply jointly.

In some embodiments, the video bitstream 116 includes a third syntax element 436 for a first CCSO filtering control parameter 438 indicating whether to apply a CCSO setting 430 of a maximum number of bands 430A, a filter shape 430B, and/or a quantizer selection 430C for the first color component 410 of the current image frame 406C. When the first CCSO filtering control parameter 438 indicates that the CCSO setting 430 is applied to the first color component 410, a fourth syntax element 446 is identified in the video bitstream 116 for a second CCSO filtering control parameter 448 indicating whether to apply the CCSO setting 430 on a second color component 420 of the current image frame 406C. The video decoder 122 determines whether to apply the CCSO setting 430 on a second color sample 420C of the second color component 420 of the current image frame 406C based on the fourth syntax element 446.

In some embodiments, the video decoder 122 determines that the first CCSO filtering control parameter 438 indicates that the CCSO setting 430 is applied to the first color component 410. When the second CCSO filtering control parameter 448 indicates that the CCSO setting 430 is not applied on the second color component 420, the video decoder 122 aborts applying the CCSO setting 430 on generation of a second sample offset 424 for the second color sample 420C of the second color component 420. Conversely, in some embodiments, the video decoder 122 determines that the first CCSO filtering control parameter 438 indicates that the CCSO setting 430 is applied to the first color component 410. The video decoder 122 also determines that the second CCSO filtering control parameter 448 indicates that the CCSO setting 430 is applied to the second color component 420. A second sample offset 424 is generated for the second color sample 420C of the second color component 420 based on the CCSO setting 430.

It is noted that, when the CCSO filtering control parameter 438 or 448 is applied, the CCSO setting 430, which is controlled by the parameter 438 or 448 is selected from a maximum number of bands 430A, a filter shape 430B, and a quantizer selection 430C.

In some embodiments, the video bitstream 116 includes a joint syntax element 442 for a frame level joint CCF flag 440. The joint CCF flag 440 is configured to indicate whether to apply a plurality of cross-component filtering operations 444 on the current image frame 406C jointly. Examples of the cross-component filtering operations 444 include, but are not limited to, CCSO filtering 414 and cross-component Wiener filtering. In each cross-component filtering operation 444, a sample vale of a certain color sample is adjusted based on one or more sample values of the color samples of the same color component or a different color component. Further, in some embodiments, when the frame level joint CCF flag 440 indicates that the plurality of CCF operations 444 are not applied on the current image frame 406C, the video decoder 122 aborts application of each of the plurality of CCF operations 444 on the current image frame 406C including the first color sample 410C of the first color component 410.

Conversely, in some embodiments, when the frame level joint CCF flag 440 indicates that the plurality of CCF operations 444 are applied on the current image frame 406C, the video decoder 122 applies at least one of the plurality of CCF operations on the current image frame 406C including the first color sample 410C of the first color component 410. Alternatively, in some embodiments, when the frame level joint CCF flag 440 indicates that the plurality of CCF operations 444 are applied on the current image frame 406C, the video decoder 122 identifies, in the video bitstream 116, a plurality of CCF syntax elements (e.g., first syntax element 408) for a plurality of CCF flags (e.g., CCSO flag 412) indicating whether to apply the plurality of CCF operations 444 (e.g., CCSO filtering 414) on the current image frame 406C separately and individually.

In some embodiments, the plurality of CCF operations 444 include a last CCF operation 444L and one or more remaining CCF operations 444R (e.g., CCSO filtering 414), and the video bitstream 112 includes one or more remaining CCF syntax elements (e.g., first syntax element 408) for one or more remaining CCF flags (e.g., CCSO flag 412) indicating whether to apply the one or more remaining CCF operations 444R on the current image frame 406C separately. For example, when the frame level joint CCF flag 440 indicates that the plurality of CCF operations 444 are applied on the current image frame 406C, the video decoder 122 identifies, in the video bitstream 116, one or more remaining CCF syntax elements for one or more remaining CCF flags. Based on the one or more remaining CCF syntax elements, the video decoder 122 determines that the one or more remaining CCF flags (e.g., CCSO flag 412) are disable and the one or more remaining CCF operations 444R are not applied. No last CCF flag is signaled and identified for the last CCF operation 444L, and that a last CCF operation 444L is applied on the current image frame 406C.

Figure 5:
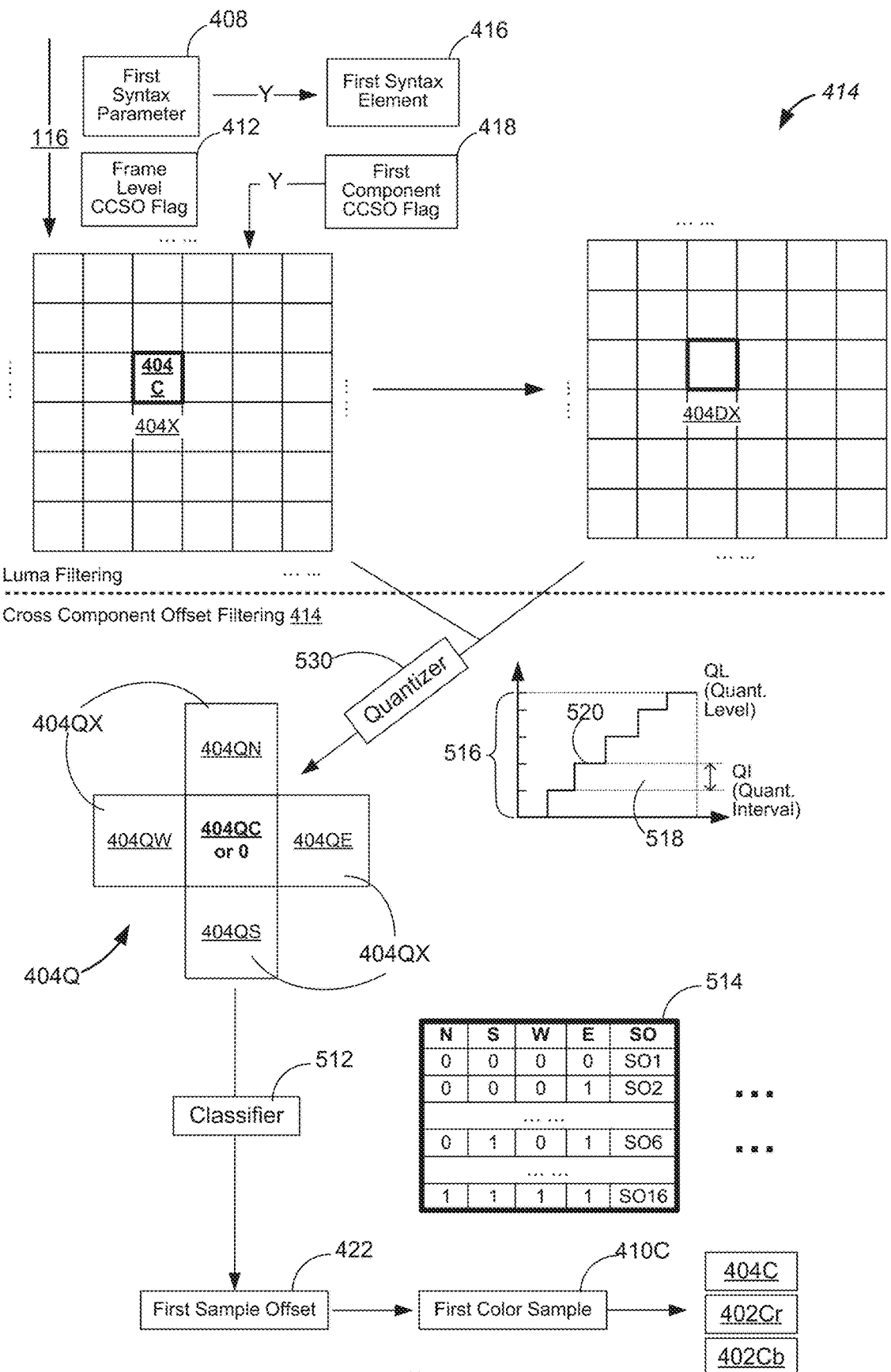
FIG. 5 is a flow diagram of an example process of applying CCSO filtering in in-loop filtering, in accordance with some embodiments.

FIG. 5 is a flow diagram of an example process of applying CCSO filtering 414 in in-loop filtering, in accordance with some embodiments. A decoder 122 receives a video bitstream 116 including a current image frame 406C. The video bitstream 116 includes a high level syntax element 408 for a frame level cross-component sample offset (CCSO) flag 412 indicating whether to apply CCSO filtering 414 on the current image frame 406C. Based on the high level syntax element 408, the decoder 122 determines whether to apply CCSO filtering 414 on the current image frame 406C. When the frame level CCSO flag 412 indicates that CCSO filtering 414 is applied the current image frame 406C, the video decoder 122 identifies, in the video bitstream 116, a first syntax element 416 for a first component CCSO flag 418 indicating whether to apply CCSO filtering 414 on a first color component 410 of the current image frame 406C, and determines whether to apply CCSO filtering 414 on a first color sample 410C of the first color component 410 based on the first syntax element 416. The video decoder 122 reconstructs the current image frame 406C including the first color sample 410C of the first color component 410.

In some embodiments, when the frame level CCSO flag 412 indicates that CCSO filtering 414 is applied on the current image frame 406C, the video decoder 122 further determines that the first component CCSO flag 418 indicates that CCSO filtering 414 is applied on the first color component 410, and generates a first sample offset 422 for the first color sample 410C of the first color component 410 based on one or more luma samples 404. Further, in some embodiments, the video decoder 122 identifies the one or more luma samples 404 including a first luma sample 404C and one or more neighboring luma samples 404X. The first luma sample 404X is collocated with the first color sample 410C in the current image frame 406C. The first sample offset 422 of the first color sample 410C is determined based on the first luma sample 404C and the one or more neighboring luma samples 404X. The first color sample 410C is adjusted based on the first sample offset 422 of the first color sample 410C.

In some embodiments associated with edge offset, one or more difference values 404DX are determined between the one or more neighboring luma samples 404X and the first luma sample 404C that is collocated with of the first color sample 410. The one or more difference values are quantized to generate one or more quantized values 404Q. The first color sample 410C is classified based on the one or more quantized values 404Q to determine the first sample offset 422 of the first color sample 410. Alternatively, in some embodiments associated with band offset, the set of luma samples 404 is quantized to generate one or more quantized values 404Q. Luma values (not gradient values or different values) of the set of luma samples 404 are quantized. The first color sample 410C is classified based on the one or more quantized values 404Q to determine the first sample offset 422 of the first color sample 410. The decoder 122 reconstructs the current image frame 406C at least by adjusting the first color sample 410 based on the first sample offset 422. In some embodiments, the first color sample 410C is one of: the first luma sample 404C, a first red-difference chroma (Cr) sample, and a first blue-difference chroma (Cb) sample. The first luma sample 404C, the first Cb sample, and the first Cr sample are collocated with one another.

The first color sample 410C is classified, e.g., by a classifier 512, based on the quantized values 404Q to determine the first sample offset 422 of the first color sample 410C. In an example, the quantized values 404Q include the quantized values 404QC, 404QN, 404QS, 404QW, and 404QE. A lookup table 514 maps a plurality of combinations of the quantized values 404QC, 404QN, 404QS, 404QW, and 404QE to different sample offset options SO (e.g., SO1-SQ16). Based on the lookup table 514, the quantized values 404Q correspond to one of the combinations in the lookup table 514, and a corresponding sample offset option SO is identified to correspond to a combination of the quantized values 404Q and therefore selected for the first sample offset 422. In other words, in some embodiments, the decoder 122 classifies the first color sample 410C by identifying a combination of the one or more quantized values 404Q in a lookup table 514 associating a plurality of quantized combinations with a plurality of offset value options SO (e.g., SO1-SO16) and determining the first sample offset 422 corresponding to the combination of the one or more quantized values 404Q in the lookup table 514.

In some embodiments, values of luma sample(s) 404A (not associated difference values or gradients) are quantized to a plurality of integer values in a quantization range 516 using a scalar quantizer 530 including a plurality of quantization intervals 518 (QI) and a plurality of quantization levels 520 (QL), and each of the one or more quantized values 404Q includes a respective integer in the quantization range 516. For each integer value in the quantization range 516, a quantization interval 518 is defined to be a range of values assigned to the respective integer value. A quantization level 520 corresponds to the respective integer value to which the range of difference values associated with the quantization interval 518 are assigned.

In some embodiments, in a band offset only mode, only the first luma sample 404C is quantized, e.g., by the quantizer 530, and classified to determine the first sample offset 422 of the first color sample 410C. The first luma sample 404C is determined to be associated with one of a plurality of bands. Each of the plurality of bands corresponds to a respective sample offset value. The first sample offset 422 is determined to be equal to the respective sample offset value corresponding to the one of the plurality of bands.

The first color sample 410C is adjusted based on the first sample offset 422 of the first color sample 410C, thereby enabling reconstruction of the current image frame 406C. In some embodiments, the first color sample 410C includes a first chroma sample 402C that is co-located with the first luma sample 404C in the current image frame, and the first chroma sample 402C is adjusted based on the first sample offset 422. Alternatively, in some embodiments, the first color sample 410C is the first luma sample 404C, and the first luma sample 404C is adjusted based on the first sample offset 422.

In some embodiments not shown, when both the frame level CCSO flag 412 and the second component CCSO flag 428 are enabled, the second sample offset 424 of the second color sample 420C of the second color component is determined in CCSO filtering 414, e.g., based on a set of luma samples 404. For brevity, details of CCSO filtering 414 are not repeated.

Figure 6:
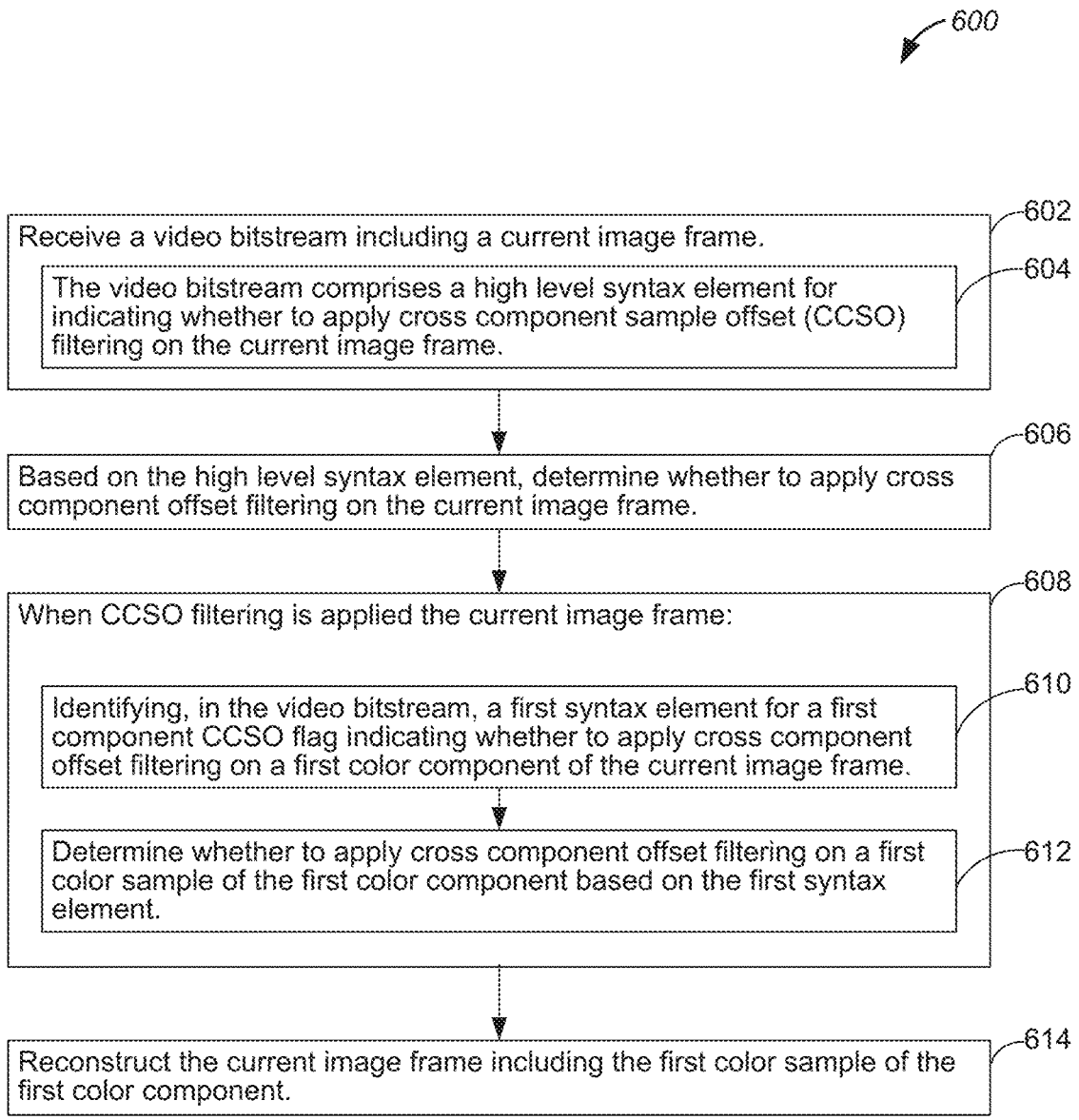
FIG. 6 is a flow diagram illustrating a method of coding video, in accordance with some embodiments.

FIG. 6 is a flow diagram illustrating an example method 600 of coding video, in accordance with some embodiments. The method 600 may be performed at a computing system (e.g., the server system 112, the source device 102, or the electronic device 120 in FIG. 1) having control circuitry and memory storing instructions for execution by the control circuitry. In some embodiments, the method 600 is applied jointly with one or more video codecs, including but not limited to, H.264, H.265/HEVC, H.266/VVC, AV1 and AVS/AVS2/AVS3. In some embodiments, a CCSO filtering method 414 (FIG. 4) is implemented based on an edge preserving loop filter that uses the reconstructed samples to compute sample offsets of luma samples 404 or chroma components 402. Control flags 418 and 428 for luma or chroma sample offsets may be signaled individually for each component on a frame level. Additional high-level flags (e.g., CCSO filtering control parameters 438 and 448) may be further introduced to control CCSO filtering parameters (e.g., CCSO setting 430) for different color components (e.g., luma samples 404, chroma samples 402).

In some embodiments, a frame level CCSO filtering enable flag (e.g., frame level CCSO flag 412) is signaled. If this flag (e.g., frame level CCSO flag 412) is true, the per component cross-component enable flags (e.g., component CCSO flags 418 and 428) are further signaled. Otherwise, if this flag (e.g., frame level CCSO flag 412) is false, the per component cross-component enable flag (e.g., component CCSO flags 418 and 428) is inferred as false.

In some embodiments, the chroma components CCSO filtering enable flags (e.g., component CCSO flags 428) are depending on the luma components flag (e.g., component CCSO flag 418). That is, if the luma CCSO filtering enable flag (e.g., component CCSO flag 418) is true, the chroma components CCSO filtering enable flags (e.g., component CCSO flags 428) are further signaled. Otherwise, if the luma CCSO filtering enable flag (e.g., component CCSO flag 418) is false, the chroma components cross-component sample offset enable flags (e.g., component CCSO flags 428) are inferred as false.

In some embodiments, a chroma component CCSO filtering enable flag (e.g., one of two component CCSO flags 428) is depending on the other chroma component flag (e.g., the other of two component CCSO flags 428). If the Cb CCSO filtering enable flag is true, the Cr CCSO filtering enable flag is further signaled. Otherwise, if the Cb CCSO filtering flag is false, the Cr CCSO filtering flag is inferred as false.

In some embodiments, dual controls (e.g., a frame level control and a component level control, two component level controls) are applied jointly to one of CCSO filtering control flags or indicators distinct from CCSO flags 412, 418, and 428. Further, in some embodiments, indicators for the maximum number of bands 430A may be shared between all different color components, or dependently signaled for different color components. Alternatively, in some embodiments, filter shape selection 430B may be shared among different color components 410 and 420. Alternatively, in some embodiments, quantizer selection 430C may be shared among different color components 410 and 420. Stated another way, a frame-level indicator is applied to control the CCSO setting 430A, 430B, or 430C, and component-level indicators may be applied based on the frame-level indicator. Alternatively, two component-level indicators associated with the CCSO setting 430A, 430B, or 430C may be signaled and applied jointly based on each other.

In some embodiments, control of CCSO flags 412, 418, and 428 may be combined. A frame level cross-component enable flag (e.g., frame level CCSO flag 412) is signaled. If the frame level cross-component enable flag (e.g., frame level CCSO flag 412) is true, dual control of two of the CCSO flags 418 and 428 is applied. Otherwise, if the frame level cross-component enable flag (e.g., frame level CCSO flag 412) is false, all of the CCSO flags 418 and 428 are set as false. For example, if the frame level CCSO flag 412 is true, the CCSO flag 428 depends on the CCSO flag 418.

In some embodiments, can control flags (e.g., a joint CCF flag 440) may be signaled jointly for a plurality of loop filtering methods 444. For example, the joint CCF flag 440 is applied to indicate whether any or all of the cross-component filtering methods 444 are applied, If the joint CCF flag 440 is false, none of the cross-component filtering methods 444 (including CCSO filtering 414) is separately signaled or applied.

In some embodiments, a first flag (e.g., a joint CCF flag 440) indicating whether any or all of the cross-component filtering methods are applied. If the joint CCF flag 440 is true, then at least one of the cross-component filtering methods 444 (including CCSO filtering 414) is applied. Further, in some embodiments, if the joint CCF flag 440 is true, an enabling flag of each cross-component filtering method 444 is further signaled. Alternatively, in some embodiments, the joint CCF flag 440 is true. Enabling flags of all cross-component filtering methods 444 are signaled as false, except the last cross-component filtering method 444L in an ordered sequence of signaling enabling flags. The last cross-component filtering method 444L is enabled, and however, the remaining CCF operations 444R are disabled. The enabling flag of the last cross-component filtering method 444L is not signaled, and however, determined as true.

Although FIG. 6 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 600 is implemented for decoding video data. The method 600 includes receiving (operation 602) a video bitstream including a current image frame, where the video bitstream comprises (operation 604) a high level syntax element indicating whether to apply cross-component sample offset (CCSO) filtering on the current image frame; based on the high level syntax element, determining (operation 606) whether to apply CCSO filtering on the current image frame; when CCSO filtering is applied the current image frame: identifying (operation 610), in the video bitstream, a first syntax element for a first component CCSO flag indicating whether to apply CCSO filtering on a first color component of the current image frame; and determining (operation 612) whether to apply CCSO filtering on a first color sample of the first color component based on the first syntax element; and reconstructing (operation 614) the current image frame including the first color sample of the first color component.

(A2) In some embodiments of A1, the method 600 further includes, when the frame level CCSO flag indicates that CCSO filtering is disabled for a first image frame, setting a distinct component CCSO flag to indicate that CCSO filtering is not applied on the first color component of the first image frame, independently of whether any syntax element for the distinct component CCSO flag of the first image frame is signaled in the video bitstream.

(A3) In some embodiments of any of A1 or A2, the method 600 further includes, when the frame level CCSO flag indicates that CCSO filtering is applied on the current image frame and when the first component CCSO flag indicates that CCSO filtering is not applied on the first color component, aborting generation of a first sample offset for the first color sample of the first color component.

(A4) In some embodiments of A1 or A2, the method 600 further includes, when the frame level CCSO flag indicates that CCSO filtering is applied on the current image frame and when the first component CCSO flag indicates that CCSO filtering is applied on the first color component, generating a first sample offset for the first color sample of the first color component based on one or more luma samples.

(A5) In some embodiments of A4, generating the first sample offset for the first color sample of the first color component further comprises identifying the one or more luma samples including a first luma sample and one or more neighboring luma samples, wherein the first luma sample is collocated with the first color sample in the current image frame; and determining the first sample offset of the first color sample based on the first luma sample and the one or more neighboring luma samples, wherein the first color sample is adjusted based on the first sample offset of the first color sample.

(A6) In some embodiments of A5, generating the first sample offset for the first color sample of the first color component further comprises quantizing the one or more luma samples to generate one or more quantized values; and classifying the first color sample based on the one or more quantized values to determine the first sample offset of the first color sample.

(A7) In some embodiments of A5, generating the first sample offset for the first color sample of the first color component further comprises determining one or more difference values between the one or more neighboring luma samples and the first luma sample that is collocated with of the first color sample; quantizing the one or more difference values to generate one or more quantized values; and classifying the first color sample based on the one or more quantized values to determine the first sample offset of the first color sample.

(A8) In some embodiments of any of A1-A7, the first color component is one of a luma component, a blue-difference chroma component, and a red-difference chroma component.

(A9) In some embodiments of any of A1-A8, the video bitstream comprises the first syntax element for the first component CCSO flag. The method 600 further includes, when the first component CCSO flag indicates that CCSO filtering is disabled for the first color component, setting a second component CCSO flag to indicate that CCSO filtering is not applied on a second color component of the current image frame, independently of whether a second syntax element is signaled in the video bitstream.

(A10) In some embodiments of any of A1-A9, the video bitstream comprises the first syntax element for the first component CCSO flag. The method 600 further includes, when the first component CCSO flag indicates that CCSO filtering is applied to the first color component: identifying, in the video bitstream, a second syntax element for a second component CCSO flag indicating whether to apply CCSO filtering on a second color component of the current image frame; and determining whether to apply CCSO filtering on a second color sample of the second color component of the current image frame based on the second syntax element.

(A11) In some embodiments of A10, the method 600 further includes, when the first component CCSO flag indicates that CCSO filtering is applied on the first color component and when the second component CCSO flag indicates that CCSO filtering is not applied on the second color component, aborting generation of a second sample offset for the second color sample of the second color component.

(A12) In some embodiments of A10, the method 600 further includes, when the first component CCSO flag indicates that CCSO filtering is applied on the first color component and when the second component CCSO flag indicates that CCSO filtering is applied on the second color component, generating a second sample offset for the second color sample of the second color component based on one or more samples of the first color component.

(A13) In some embodiments of any of A9-A12, the first color component includes a luma component, and the second color component includes a chroma component.

(A13) In some embodiments of any of A9-A12, two chroma components include a blue-difference chroma component and a red-difference chroma component. The first color component includes a first one of the two chroma components, and the second color component includes a second distinct one of the two chroma components.

(A15) In some embodiments of any of A1-A14, the video bitstream comprises a third syntax element for a first CCSO filtering control parameter indicating whether to apply a CCSO setting for the first color component of the current image frame. The method 600 further includes, when the first CCSO filtering control parameter indicates that the CCSO setting is not applied to the first color component, setting a second CCSO filtering control parameter to indicate that the CCSO setting is not applied on a second color component of the current image frame, independently of whether a fourth syntax element is signaled in the video bitstream.

(A16) In some embodiments of any of A1-A15, the video bitstream comprises a third syntax element for a first CCSO filtering control parameter indicating whether to apply a CCSO setting of a maximum number of bands, a filter shape, and a quantizer selection for the first color component of the current image frame. The method 600 further includes, when the first CCSO filtering control parameter indicates that the CCSO setting is applied to the first color component: identifying, in the video bitstream, a fourth syntax element for a second CCSO filtering control parameter indicating whether to apply the CCSO setting on a second color component of the current image frame; and determining whether to apply the CCSO setting on a second color sample of the second color component of the current image frame based on the fourth syntax element.

(A17) In some embodiments of A16, the method 600 further includes, when the first CCSO filtering control parameter indicates that the CCSO setting is applied to the first color component and when the second CCSO filtering control parameter indicates that the CCSO setting is not applied on the second color component, aborting applying the CCSO setting on generation of a second sample offset for the second color sample of the second color component.

(A18) In some embodiments of A16, the method 600 further includes, when the first CCSO filtering control parameter indicates that the CCSO setting is applied to the first color component and when the second CCSO filtering control parameter indicates that the CCSO setting is applied on the second color component, generating a second sample offset for the second color sample of the second color component based on the CCSO setting.

(A19) In some embodiments of any of A15-A18, the CCSO setting is selected from a maximum number of bands, a filter shape, and a quantizer selection.

(A20) In some embodiments of any of A1-A19, the video bitstream includes a joint syntax element for a frame level joint CCF flag is configured to indicate whether to apply a plurality of cross-component filtering (CCF) operations on the current image frame jointly.

(A21) In some embodiments of A20, the method 600 further includes, when the frame level joint CCF flag indicates that the plurality of CCF operations are not applied on the current image frame, aborting application of each of the plurality of CCF operations on the current image frame.

(A22) In some embodiments of A20, the method 600 further includes, when the frame level joint CCF flag indicates that the plurality of CCF operations are applied on the current image frame, applying at least one of the plurality of CCF operations on the current image frame including the first color sample of the first color component.

(A23) In some embodiments of A20, the method 600 further includes, when the frame level joint CCF flag indicates that the plurality of CCF operations are applied on the current image frame, identifying, in the video bitstream, a plurality of CCF syntax elements for a plurality of CCF flags indicating whether to apply the plurality of CCF operations on the current image frame separately.

(A24) In some embodiments of A20, the plurality of CCF operations include a last CCF operation and one or more remaining CCF operations, and the video bitstream includes one or more remaining CCF syntax elements for one or more remaining CCF flags indicating whether to apply the one or more remaining CCF operations on the current image frame separately. The method 600 further includes, when the frame level joint CCF flag indicates that the plurality of CCF operations are applied on the current image frame: identifying, in the video bitstream, one or more remaining CCF syntax elements for one or more remaining CCF flags; based on the one or more remaining CCF syntax elements, determining that the one or more remaining CCF flags are disabled; and determining that a last CCF operation is applied on the current image frame, where a last CCF flag is signaled and identified for the last CCF operation.

(A25) In some embodiments, a computing system includes control circuitry and memory storing one or more programs configured to be executed by the control circuitry. The one or more programs further comprise instructions for receiving video data comprising a current image frame; encoding the current image frame; transmitting the encoded current image frame via a video bitstream; and signaling, via the video bitstream, a high level syntax element for a frame level cross-component sample offset (CCSO) flag indicating whether to apply CCSO filtering on the current image frame. A first syntax element is signaled in the video bitstream for a first component CCSO flag indicating whether to apply CCSO filtering on a first color component of the current image frame, when the frame level CCSO flag indicates that CCSO filtering is applied on the current image frame.

(A26) In some embodiments, a non-transitory computer-readable storage medium stores one or more programs for execution by control circuitry of a computing system. The one or more programs comprise instructions for obtaining a source video sequence including a current image frame and performing a conversion between the source video sequence and a video bitstream. The video bitstream comprises the current image frame and a high level syntax element for a frame level cross-component sample offset (CCSO) flag indicating whether to apply CCSO filtering on the current image frame. A first syntax element is signaled in the video bitstream for a first component CCSO flag indicating whether to apply CCSO filtering on a first color component of the current image frame, when the frame level CCSO flag indicates that CCSO filtering is applied on the current image frame.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A26 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A26 above).

The proposed methods may be used separately or combined in any order. Further, each of the methods (or embodiments), encoder, and decoder may be implemented by processing circuitry (e.g., one or more processors or one or more integrated circuits). For example, the one or more processors execute a program that is stored in a non-transitory computer-readable medium. In the following, the term block may be interpreted as a prediction block, a coding block, or a coding unit, i.e., CU.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
   receiving a video bitstream including a current image frame, wherein the video bitstream comprises a high level syntax element indicating whether to apply cross-component sample offset (CCSO) filtering on the current image frame;
   based on the high level syntax element, determining whether to apply CCSO offset filtering on the current image frame;
   when CCSO filtering is applied to the current image frame:
     identifying, in the video bitstream, a first syntax element for a first component CCSO flag indicating whether to apply CCSO filtering on a first color component of the current image frame; and
     determining whether to apply CCSO filtering on a first color sample of the first color component based on the first syntax element; and
   reconstructing the current image frame including the first color sample of the first color component.

2. The method of claim 1, further comprising:
   when the frame level CCSO flag indicates that CCSO filtering is disabled for a first image frame, setting a distinct component CCSO flag to indicate that CCSO filtering is not applied on the first color component of the first image frame, independently of whether any syntax element for the distinct component CCSO flag of the first image frame is signaled in the video bitstream.

3. The method of claim 1, further comprising, when the frame level CCSO flag indicates that CCSO filtering is applied on the current image frame:
   when the first component CCSO flag indicates that CCSO filtering is not applied on the first color component, aborting generation of a first sample offset for the first color sample of the first color component.

4. The method of claim 1, further comprising, when the frame level CCSO flag indicates that CCSO filtering is applied on the current image frame:
   when the first component CCSO flag indicates that CCSO filtering is applied on the first color component, generating a first sample offset for the first color sample of the first color component based on one or more luma samples.

5. The method of claim 4, wherein generating the first sample offset for the first color sample of the first color component further comprising:
   identifying the one or more luma samples including a first luma sample and one or more neighboring luma samples, wherein the first luma sample is collocated with the first color sample in the current image frame; and determining the first sample offset of the first color sample based on the first luma sample and the one or more neighboring luma samples, wherein the first color sample is adjusted based on the first sample offset of the first color sample.

6. The method of claim 5, generating the first sample offset for the first color sample of the first color component further comprising:

quantizing the one or more luma samples to generate one or more quantized values; and classifying the first color sample based on the one or more quantized values to determine the first sample offset of the first color sample.

7. The method of claim 5, generating the first sample offset for the first color sample of the first color component further comprising:

determining one or more difference values between the one or more neighboring luma samples and the first luma sample that is collocated with of the first color sample;

quantizing the one or more difference values to generate one or more quantized values; and classifying the first color sample based on the one or more quantized values to determine the first sample offset of the first color sample.

8. The method of any of claim 1, wherein the first color component is one of a luma component, a blue-difference chroma component, and a red-difference chroma component.

9. The method of claim 1, wherein the video bitstream comprises the first syntax element for the first component CCSO flag, the method further comprising:

when the first component CCSO flag indicates that CCSO filtering is disabled for the first color component, setting a second component CCSO flag to indicate that CCSO filtering is not applied on a second color component of the current image frame, independently of whether a second syntax element is signaled in the video bitstream.

10. The method of claim 1, wherein the video bitstream comprises the first syntax element for the first component CCSO flag, the method further comprising:

when the first component CCSO flag indicates that CCSO filtering is applied to the first color component:

identifying, in the video bitstream, a second syntax element for a second component CCSO flag indicating whether to apply CCSO filtering on a second color component of the current image frame; and determining whether to apply CCSO filtering on a second color sample of the second color component of the current image frame based on the second syntax element.

11. The method of claim 10, further comprising, when the first component CCSO flag indicates that CCSO filtering is applied on the first color component:

when the second component CCSO flag indicates that CCSO filtering is not applied on the second color component, aborting generation of a second sample offset for the second color sample of the second color component.

12. The method of claim 10, further comprising, when the first component CCSO flag indicates that CCSO filtering is applied on the first color component:

when the second component CCSO flag indicates that CCSO filtering is applied on the second color component, generating a second sample offset for the second color sample of the second color component based on one or more samples of the first color component.

13. The method of any of claim 9, wherein the first color component includes a luma component, and the second color component includes a chroma component.

14. The method of any of claim 9, wherein two chroma components include a blue-difference chroma component and a red-difference chroma component, and wherein the first color component includes a first one of the two chroma components, and the second color component includes a second distinct one of the two chroma components.

15. The method of claim 1, wherein the video bitstream comprises a third syntax element for a first CCSO filtering control parameter indicating whether to apply a CCSO setting for the first color component of the current image frame, the method further comprising:

when the first CCSO filtering control parameter indicates that the CCSO setting is not applied to the first color component, setting a second CCSO filtering control parameter to indicate that the CCSO setting is not applied on a second color component of the current image frame, independently of whether a fourth syntax element is signaled in the video bitstream.

16. The method of claim 1, wherein the video bitstream comprises a third syntax element for a first CCSO filtering control parameter indicating whether to apply a CCSO setting of a maximum number of bands, a filter shape, and a quantizer selection for the first color component of the current image frame, the method further comprising:

when the first CCSO filtering control parameter indicates that the CCSO setting is applied to the first color component:

identifying, in the video bitstream, a fourth syntax element for a second CCSO filtering control parameter indicating whether to apply the CCSO setting on a second color component of the current image frame; and determining whether to apply the CCSO setting on a second color sample of the second color component of the current image frame based on the fourth syntax element.

17. The method of claim 16, further comprising, when the first CCSO filtering control parameter indicates that the CCSO setting is applied to the first color component:

when the second CCSO filtering control parameter indicates that the CCSO setting is not applied on the second color component, aborting applying the CCSO setting on generation of a second sample offset for the second color sample of the second color component.

18. The method of claim 16, further comprising, when the first CCSO filtering control parameter indicates that the CCSO setting is applied to the first color component:

when the second CCSO filtering control parameter indicates that the CCSO setting is applied on the second color component, generating a second sample offset for the second color sample of the second color component based on the CCSO setting.

19. The method of any of claim 15, wherein the CCSO setting is selected from a maximum number of bands, a filter shape, and a quantizer selection.

20. The method of claim 1, wherein the video bitstream includes a joint syntax element for a frame level joint CCF flag is configured to indicate whether to apply a plurality of cross-component filtering (CCF) operations on the current image frame jointly, the high level syntax element including a frame level syntax element.

21. The method of claim 20, further comprising:
when the frame level joint CCF flag indicates that the plurality of CCF operations are not applied on the current image frame, aborting application of each of the plurality of CCF operations on the current image frame.

22. The method of claim 20, further comprising:
when the frame level joint CCF flag indicates that the plurality of CCF operations are applied on the current image frame, applying at least one of the plurality of CCF operations on the current image frame including the first color sample of the first color component.

23. The method of claim 20, further comprising:
when the frame level joint CCF flag indicates that the plurality of CCF operations are applied on the current image frame, identifying, in the video bitstream, a plurality of CCF syntax elements for a plurality of CCF flags indicating whether to apply the plurality of CCF operations on the current image frame separately.

24. The method of claim 20, wherein the plurality of CCF operations include a last CCF operation and one or more remaining CCF operations, and the video bitstream includes one or more remaining CCF syntax elements for one or more remaining CCF flags indicating whether to apply the one or more remaining CCF operations on the current image frame separately, the method further comprising:
when the frame level joint CCF flag indicates that the plurality of CCF operations are applied on the current image frame:
identifying, in the video bitstream, one or more remaining CCF syntax elements for one or more remaining CCF flags;
based on the one or more remaining CCF syntax elements, determining that the one or more remaining CCF flags are disabled; and
determining that a last CCF operation is applied on the current image frame, wherein a last CCF flag is signaled and identified for the last CCF operation.

25. A computing system, comprising:
control circuitry; and
memory storing one or more programs configured to be executed by the control circuitry, the one or more programs further comprising instructions for:
receiving video data comprising a current image frame;
encoding the current image frame;
transmitting the encoded current image frame via a video bitstream; and
signaling, via the video bitstream, a high level syntax element for a frame level cross-component sample offset (CCSO) flag indicating whether to apply CCSO filtering on the current image frame;
wherein a first syntax element is signaled in the video bitstream for a first component CCSO flag indicating whether to apply CCSO filtering on a first color component of the current image frame, when the frame level CCSO flag indicates that CCSO filtering is applied on the current image frame.

26. A non-transitory computer-readable storage medium storing one or more programs for execution by control circuitry of a computing system, the one or more programs comprising instructions for:
obtaining a source video sequence including a current image frame; and
performing a conversion between the source video sequence and a video bitstream, wherein the video bitstream comprises:
the current image frame; and
a high level syntax element for a frame level cross-component sample offset (CCSO) flag indicating whether to apply CCSO filtering on the current image frame;
wherein a first syntax element is signaled in the video bitstream for a first component CCSO flag indicating whether to apply CCSO filtering on a first color component of the current image frame, when the frame level CCSO flag indicates that CCSO filtering is applied on the current image frame.

* * * * *